US008332350B2

(12) United States Patent
Pulfer et al.

(10) Patent No.: US 8,332,350 B2
(45) Date of Patent: Dec. 11, 2012

(54) METHOD AND SYSTEM FOR AUTOMATED SECURITY ACCESS POLICY FOR A DOCUMENT MANAGEMENT SYSTEM

(75) Inventors: Charles Edouard Pulfer, Ottawa (CA); Benjamin Taylor Whitney, Ottawa (CA); Regi Baby Roy, Ottawa (CA)

(73) Assignee: Titus Inc., Ottawa, Ontario (CA)

( * ) Notice: Subject to any disclaimer, the term of this patent is extended or adjusted under 35 U.S.C. 154(b) by 345 days.

(21) Appl. No.: 12/749,291

(22) Filed: Mar. 29, 2010

(65) Prior Publication Data

US 2010/0262577 A1    Oct. 14, 2010

Related U.S. Application Data

(60) Provisional application No. 61/167,683, filed on Apr. 8, 2009.

(51) Int. Cl.
G06F 7/00 (2006.01)
G06F 17/30 (2006.01)

(52) U.S. Cl. ......... 707/608; 707/783; 707/784; 707/785

(58) Field of Classification Search .................. 707/608, 707/783–785
See application file for complete search history.

(56) References Cited

U.S. PATENT DOCUMENTS

| | | |
|---|---|---|
| 6,609,200 B2 | 8/2003 | Anderson |
| 6,775,689 B1 | 8/2004 | Raghunandan |
| 7,346,769 B2 | 3/2008 | Forlenza |
| 7,392,289 B2 | 6/2008 | Curry |
| 7,467,399 B2 | 12/2008 | Nadalin |
| 7,685,645 B2 | 3/2010 | Doyle |
| 7,958,147 B1 | 6/2011 | Turner et al. |
| 2003/0105734 A1* | 6/2003 | Hitchen et al. ............. 707/1 |
| 2003/0115208 A1* | 6/2003 | Fujiwara et al. ............. 707/100 |
| 2003/0131057 A1 | 7/2003 | Basson et al. |
| 2004/0006598 A1 | 1/2004 | Bargagli Damm et al. |
| 2004/0013302 A1 | 1/2004 | Ma et al. |
| 2004/0024775 A1 | 2/2004 | Kemp |
| 2005/0187937 A1* | 8/2005 | Kawabe et al. ............. 707/9 |
| 2005/0251508 A1* | 11/2005 | Shimizu ............. 707/2 |
| 2006/0075228 A1 | 4/2006 | Black et al. |
| 2006/0085469 A1* | 4/2006 | Pfeiffer et al. ............. 707/102 |
| 2006/0117010 A1* | 6/2006 | Hakala ............. 707/9 |
| 2006/0271596 A1* | 11/2006 | Sabsevitz et al. ............. 707/200 |
| 2007/0027873 A1* | 2/2007 | Factor et al. ............. 707/9 |
| 2007/0094594 A1 | 4/2007 | Matichuk et al. |
| 2007/0116281 A1 | 5/2007 | Brown |
| 2007/0174285 A1* | 7/2007 | Dutta et al. ............. 707/9 |
| 2007/0226174 A1* | 9/2007 | Saito ............. 707/1 |
| 2007/0233687 A1* | 10/2007 | Iwase ............. 707/9 |
| 2008/0062472 A1 | 3/2008 | Garg |
| 2008/0072032 A1 | 3/2008 | Cohen et al. |
| 2008/0104118 A1 | 5/2008 | Pulfer |
| 2008/0114725 A1 | 5/2008 | Indeck et al. |
| 2008/0168135 A1 | 7/2008 | Redlich et al. |
| 2008/0229428 A1* | 9/2008 | Camiel ............. 726/27 |

(Continued)

Primary Examiner — Shahid Alam
Assistant Examiner — Joshua Bullock
(74) Attorney, Agent, or Firm — IP-MEX Inc.; Victoria Donnelly

(57) ABSTRACT

A method and system for providing an automated security access policy in a document management system are described. The security policies are applied based on metadata rules. Once a document is added to the document managements system, the metadata rules are evaluated using the metadata of the document. Based on the results of the evaluation security access policies are applied to the document.

20 Claims, 8 Drawing Sheets

U.S. PATENT DOCUMENTS

| | | |
|---|---|---|
| 2008/0270807 A1 | 10/2008 | Forlenza |
| 2008/0301760 A1* | 12/2008 | Lim .................................. 726/1 |
| 2009/0006851 A1 | 1/2009 | Freeman |
| 2009/0019379 A1 | 1/2009 | Pendergast |
| 2009/0030884 A1 | 1/2009 | Pulfer |
| 2009/0106271 A1* | 4/2009 | Chieu et al. ................... 707/100 |
| 2009/0254572 A1 | 10/2009 | Redlich et al. |
| 2009/0296166 A1 | 12/2009 | Schrichte |
| 2010/0030798 A1 | 2/2010 | Kumar et al. |
| 2010/0174751 A1* | 7/2010 | Kawano et al. ................ 707/784 |
| 2010/0185676 A1* | 7/2010 | Weaver et al. ................. 707/783 |
| 2010/0313239 A1 | 12/2010 | Chakra et al. |
| 2011/0202618 A1 | 8/2011 | Kritt et al. |

* cited by examiner

| Attribute Name | Attribute Type | Data Type | Example Attribute Value |
|---|---|---|---|
| File Name | Contextual | Text | "My Document.doc" |
| File Type | Contextual | Text | "Microsoft Word Document" |
| Date Modified | Contextual | Date/Time | 27 January 2009 15:25:04 |
| File Size | Contextual | Number | 24,390 bytes |
| Word Count | Contextual | Number | 724 words |
| Author | Applied | Text | "Ben Whitney" |
| Classification Level | Applied | Text | "CLASSIFIED" |
| Description | Applied | Text | "A description of my document" |
| Release Policy | Applied | Text | "Do Not Release Internal Use Only" |
| Content Analysis | Dynamic | Text | Result of content analysis query of document. |
| Database Lookup | Dynamic | Text | Results of database query on specified metadata. |
| Image Analysis | Dynamic | Text | Results of image analysis query of document images. |

| Titus Labs | | 14 | |
|---|---|---|---|
| Field Name | Operator | Value | Permission Set |
| Content Type | Equals | Secret Document | Secret Policy |

12

Add New Metadata Security Policy

Field Name

| Title |

Operator

| Equals |

Value

| Sasquatch |

Permission Set to Apply

| -- Default Permission -- |

Edit Permissions ...

| Add Rule |

*Figure 1(6)*

METHOD AND SYSTEM FOR AUTOMATED SECURITY ACCESS POLICY FOR A DOCUMENT MANAGEMENT SYSTEM

CROSS REFERENCE TO RELATED APPLICATIONS

The present application claims benefit from the U.S. provisional application Ser. No. 61/167,683 for "Automated Security Access Policy for a Document Management System" filed on Apr. 8, 2009, the entire contents of which are incorporated herein by reference.

FIELD OF INVENTION

The invention generally relates to document management systems, and in particular, to a system and method providing an automated security access policy in a document management system.

BACKGROUND OF THE INVENTION

Maintenance of security of electronic documents such as files is an important aspect of any multiuser system. Various users may have various access rights for a given document. For example, some users may be denied access to it, some may be allowed to only read it, some may be allowed to read as well as modify it whereas some others may be able to only execute it. Both the maintenance of the access rights of the various uses for the different documents stored on the system as well as controlling document access in accordance with these stored access rights are crucial for a successful system operation.

Document management systems, or file management systems, also to be referred to as file server security systems, e.g., SharePoint, have an established paradigm of applying security policies providing access to files. Each document and folder has an "Access Control List" (ACL), which specifies users and groups who have access to the document and folder, and security access rights they have to the document and folder. Documents in folders inherit permissions of the folder and may override the privileges of an individual document, if necessary. This paradigm works well for some situations; however it only provides a hierarchal approach to applying security access policies to documents and folders in a document management system. This approach becomes less effective when administrators need to apply different security policies to each document, which makes defining the security access policies very time consuming.

Therefore there is a need in the industry for developing an improved process for providing security access policy in a document management system.

SUMMARY OF THE INVENTION

There is an object of the invention to provide an improved method and system for automatically providing security access policy in a document management system, which would avoid or mitigate the disadvantages of the prior art.

According to one aspect of the invention, there is provided a computerized method for automatically providing a security access policy to an electronic document in a document management system, the method comprising:
(a1) associating metadata with the document, the metadata comprising one or more attributes of the document;
(b1) configuring security access policies to be applied to documents in the document management system, including specifying one or more metadata rules governing application of security access policies to the documents; and
(c1) determining the security access policy to be applied to the document to be added to the document management system based on said one or more metadata rules and the metadata associated with the document.

The step (b1) of the method comprises:
(a2) creating said one or more metadata rules, comprising configuring a permission configuration web page;
(b2) storing said one or more metadata rules in a permissions setting configuration file; and
(c2) communicating the permissions setting configuration file to the document management system.

The step (a1) of the method comprises providing the attribute comprising a first field containing a name of the attribute and a second field containing a value of the attribute.

In the embodiments of the invention, the step (b1) comprises specifying said one or more metadata rules comprising a target name, a target value, a comparison operation for comparing the target value with the second field of the attribute the first field of which matches the target name, and the security access policy, comprising a permission set to be applied to the document for controlling access to the document based on results of the comparison operation.

Conveniently, the name of the attribute is selected from the group consisting of file size, file name, file type, date modified, word count, and author.

In the method described above, the step (c1) comprises:
(a6) receiving a notification from the document management system regarding adding the document to the document management system;
(b6) evaluating each metadata rule by performing the comparison operation in said each metadata rule; and
(c6) for said each metadata rule, applying the permission set to the document.

In the embodiments of the invention, the step (c6) comprises changing an access control list in the document management system, the access control list including names of users having access to the document along with corresponding levels of access of the users.

In the method described above, the specifying said one or more metadata rules comprises specifying a compound expression for performing multiple comparisons on the target name and the target value.

In the method described above, the specifying comprises specifying metadata including one or more of a contextual metadata that is inferred from contents of the document, an applied metadata that is attached to the document by an external program, and a dynamic metadata that is dynamically retrieved based on content analysis performed outside the document management system Conveniently, the step (b2) comprises storing the permissions setting configuration file in an Extensible Markup Language (XML) format.

According to another aspect of the invention, there is provided a computer readable storage medium, having a computer readable program code instructions stored thereon, which, when executed by a computer, perform the following steps:
(a10) associating metadata with a document, the metadata comprising one or more attributes of the document;
(b10) configuring security access policies to be applied to documents in a document management system, including specifying one or more metadata rules governing application of security access policies to the documents; and
(c10) determining a security access policy to be applied to the document to be added to the document management system based on said one or more metadata rules and the metadata associated with the document.

According to yet another aspect of the invention, there is provided a system for automatically providing a security access policy to an electronic document in a document management system, the system comprising:

a processor, and a computer readable storage medium having computer readable instructions stored thereon, which, when executed by the processor, form the following:

(a11) a metadata storage module, storing metadata associated with the document, the metadata comprising one or more attributes of the document;

(b11) a security policy configuration module, configuring security access policies to be applied to documents in the document management system, including specifying one or more metadata rules governing application of security access policies to the documents; and (c11) a security policy determination module, determining the security access policy to be applied to the document to be added to the document management system based on said one or more metadata rules and the metadata associated with the document.

The security policy configuration module (b11) comprises:

(a12) a policy handler module, creating said one or more metadata rules, comprising configuring a permission configuration web page;

(b12) a permissions setting configuration file, storing said one or more metadata rules; and (c12) a policy configuration control module, communicating the permissions setting configuration file to the document management system.

The attribute of the document comprises a first field containing a name of the attribute and a second field containing a value of the attribute.

In the system described above, said one or more metadata rules comprise a target name, a target value, a comparison operation for comparing the target value with the second field of the attribute the first field of which matches the target name, and the security access policy, comprising a permission set to be applied to the document for controlling access to the document based on results of the comparison operation Conveniently, the name of the attribute is selected from the group consisting of: file size, file name, file type, date modified, word count, and author.

In the system described above, the security policy determination module (c11) comprises:

(a16) a dispatcher module, receiving a notification from the document management system regarding adding the document to the document management system;

(b16) a metadata rule evaluator module, evaluating each metadata rule by performing the comparison operation in said each metadata rule; and (c16) a permission processor module, applying, for each said metadata rule, the permission set to the document.

The permission processor module (c16) comprises computational means for changing an access control list in the document management system, the access control list including names of users having access to the document along with respective levels of access of the users.

In the embodiments of the invention, said one or more metadata rules comprises a compound expression for performing multiple comparisons on the target name and the target value.

Conveniently, the document management system is a Microsoft Share Point document library.

Thus, an improved method and system for automatically providing security access policy in a document management system have been described.

BRIEF DESCRIPTION OF THE DRAWINGS

Further features and advantages of the invention will be apparent from the following description of the embodiment, which is described by way of example only and with reference to the accompanying drawings, in which:

FIG. 1(a) presents a table illustrating an example list of attributes for a document;

FIG. 1(b) shows a sample implementation of a metadata rule configuration interface of the embodiment of the invention;

DETAILED DESCRIPTION OF THE EMBODIMENTS OF THE INVENTION

Glossary

Figure 2:
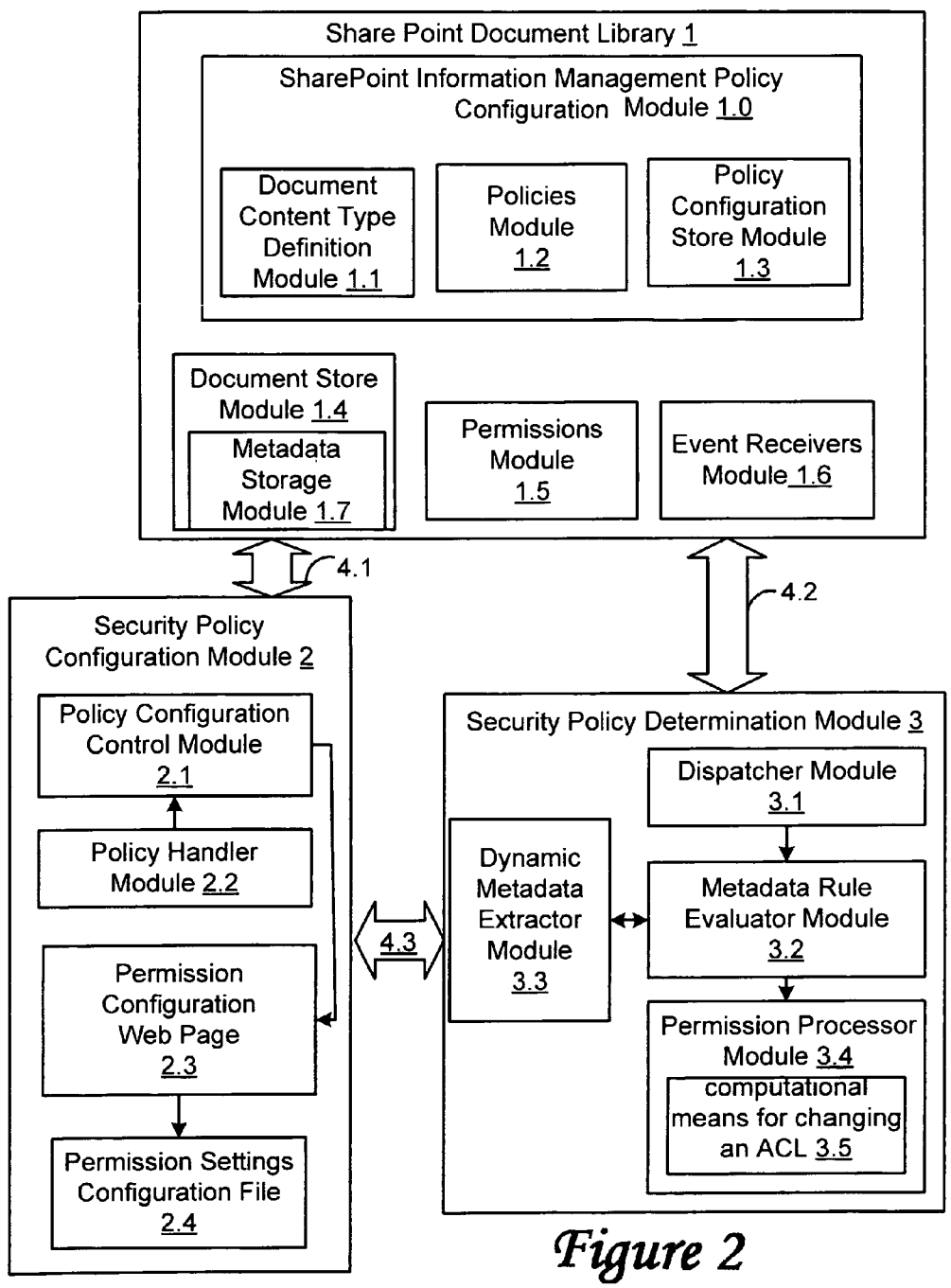
FIG. 2 shows a system 30 for a providing an automated security access policy to an electronic document in a document management system and illustrates its connection to the document management system.

| | |
|---|---|
| Access control list | includes names of users having access to the document along with respective levels of access of the users |
| Compound expression | characterizes multiple comparison operations on the target name and the target value |
| First field | contains name of the attribute |
| Metadata | comprises one or more attributes of the document |
| Metadata rules | rules governing application of security access policies |
| Second field | contains value of the attribute |
| XML | Extensible Markup Language |

Embodiments of the present invention describe methods and system for providing security access policies to documents. These documents often include files. Thus, the terms file and document are used interchangeably in this application. Embodiments of the present invention provide a classification-based method and system providing security access policy in a document management system. The invention allows documents to be granted security access based on their specified classification, category, physical attributes or tags. In particular, the embodiments of the invention provide an automated security access policy for a document management system, such as the Microsoft® Windows SharePoint Services platform. Security access policies of the documents in a library are derived based on attributes of the documents, known as metadata. The embodiments of the invention can however be adapted to other document management systems as well.

The method providing security access policy is guided by a set of metadata rules.

The metadata rules provided by a system administrator are stored and are processed along with the metadata (attributes) associated with documents. Each metadata rule can be evaluated to be either true or false, and comprises four parts:

i) Target name: A target name can range from physical attributes of a document (e.g. the date modified, file size, file name), to customizable labeling of the document (such as Classification Level, Title, Customer Number).

ii) Comparison operation: The comparison operators are mathematical and text comparison operators which return a true or false value. For example: greater than, less than, equals, does not equal, and contains.

iii) Target value: The target value to compare to is dependent on the type of comparison being performed, and includes a numerical value such as a number, date, currency, a text value such as, "Classified". The target values may not be required at all for some operations such as "property exists".

iv) Security access policy: This comprises a permission set to be applied to the document. Based on the results of evaluation of a metadata rule, a series of permission actions can be performed on the Access Control List of the item in a SharePoint document management system for example, allowing users and user groups to be granted and revoked access.

Two or more comparison operations can be combined to form a larger (complex) compound expression with the use of optional joining operators, such as "AND" and "OR".

For example: [Title] contains "secret" AND [Releasable]= "False"

With the four parts of the metadata rule, the evaluation of the metadata rule is performed in the following way. As described earlier, metadata comprises attributes of a document. Each attribute of the document comprises a first field that contains the name of the attribute and a second field that contains the value of the attribute. For example the first field of an attribute can be file size with the second filed as 1 Mbytes. When a metadata rule is evaluated its target name is matched with the first field of the attributes of the document. The following formula is then used on the matched attribute:

IF second Field of the matched attribute compares to target value, then apply security access policy.

Please note that the type of the "compares" operation is specified through the comparison operator in the metadata rule. Compound expressions using the joining operators AND and OR allow for complex comparison operations. For example, If second field of matched attribute 1 compares to target value 1 AND second field of matched attribute 2 compares to target value 2, then apply security access policy.

Note that the matching of an attribute i comprises the matching of the first field of the attribute with the target name i specified in the metadata rule.

An alternative form of metadata rule allows the negative (else) condition to have an associated security access policy. For example:

IF second field of the matched attribute compares to target value, then apply security access policy 1, else apply security access policy 2.

The permission set associated with the If part is also referred to as the "True permissions" and that associated with the else part is also referred to as "false" permission".

In the embodiments of the invention, the metadata rules comprise computer readable instructions stored in a computer readable storage medium, e.g., computer memory, DVD, CD-ROM, floppy or other medium, which, when executed by a processor, form the metadata rules including the four parts described, and perform the evaluation of the metadata as described earlier.

The approach to automatically providing security access policy in a document management system described earlier provides numerous advantages. For example, it provides a unique and flexible security access structure, with which, system administrators need only define the overall metadata rules that automatically provide the security access policy, allowing different documents to have security access policies based on their content and attributes. As a result, system administrators do not need to separately define security access policy for each document, making security access management of documents significantly easier.

Parts of the Metadata Rule

As mentioned earlier, a metadata rule contains a target name, a comparison operation, a target value, and a security policy. These four parts are explained in more detail.

Target Name

A target name is matched with the name of an attribute in the metadata. Metadata is information which describes other data. Computer files have a large quantity of metadata from multiple sources as it is processed by various computer programs and users.

Metadata is associated with each document and describes the content and context of its use. It comprises attributes of the document, which in the embodiments of the invention include: attribute name, attribute type, data type, and attribute value. For example, the metadata for a Microsoft Word document may comprise various attributes associated with the document. An example list of such attributes is presented in table 9 of FIG. 1(*a*). For Microsoft documents, an attribute can be one of the built in fields in SharePoint such as File Name, File Type, Title, Author, User Last Modified By, Content Type, or any of the custom columns added to the document library by the user.

The value of an attribute corresponding to a given attribute name is converted from its native data type, which includes text, user id and number, into a digital format for comparison purposes, and is stored as a corresponding "data type" as illustrated in column 3 of table 9 shown in FIG. 1(*a*). The data type corresponding to a value of the attribute can be numerical, text, date and time, true/false or binary data.

In the embodiment of the invention, the attribute type includes Contextual Metadata and Applied Metadata. Contextual Metadata is metadata that can be inferred through examination of the document and its contents. This can be interpreted with the help of computer software by looking at the physical attributes of the computer file or the object(s) which the file represents.

Examples of contextual metadata include the following: File Length, Creation Date, Last Modification Date, Photo Width and Height and Word Count;

Applied metadata is metadata that is attached to the document by an external program. Often a user assists in applying metadata, such as describing key words or entering a sentence describing the document. Applied metadata is often saved as a section within the document which can be examined by other computer programs.

Examples of Applied metadata include Description, Category, Key words, Classification Level and Customer ID. Dynamic Metadata that is handled in an alternate embodiment is dynamically retrieved based on external content analysis and cannot be inferred directly from the document contents. Dynamic metadata requires processing of the document by a metadata extractor that is either an internal system or an external unit invoked through a network connection.

Examples of Dynamic metadata are: external database queries, automated image analysis and content analysis using natural language processing all of which are Metadata fields corresponding to the Dynamic metadata type.

When a document is added to a document management system such as Microsoft SharePoint, metadata are extracted from the document and made available to system of the present invention through a storage unit storing the metadata. When dynamic metadata is requested, a Dynamic metadata extractor is used to perform metadata extraction.

Comparison Operators

A comparison operation is an important part of a metadata rule. The comparison operators return a true or false value. Conveniently, they are case-insensitive, meaning that upper case letters are considered equal to lower-case letters. Metadata value is read as digital value, irrespective of whether it is text, numbers, dates or other data types, and as such, comparisons can be evaluated based on the data. Examples of comparison operations are provided next:

If Document Title contains "Budget", apply permission set "Financial Group";
If Security Classification equals "Classified", apply permission set "Classified Users";
If Content Type equals "Marketing Slideshow", apply permission set "Marketing".

For example, using table 9 shown in FIG. 1(a), the comparison "[Word Count]>1000" would evaluate to false, since the attribute having a name Word Count has a value of 724.

On the other hand if "[Classification Level]='CLASSIFIED' is evaluated, the result of the evaluation would be true, since that is the value of the attribute with name Classification Level.

Examples of comparison operators include:
i. Less Than (<)
ii. Less Than or Equal To (<=)
iii. Greater Than (>)
iv. Greater Than or Equal To (>=)
v. Equals (=)
vi. Does Not Equal (!=)
vii. Contains Value
viii. Does Not Contain Value
ix. Exists
x. Does Not Exist
xi. Starts With
xii. Ends With Not all operators are applicable with all types of data. For example, asking if "apple>orange" doesn't make much sense. Other operators such as "contains value" and "does not contain value" are only valid for text values. Operators such as "exists" and "does not exist" ask only if the attribute with a given name was part of the metadata, regardless of value, and as such does not require a value to compare to.

Evaluation of Metadata Comparisons

The comparison operators that are supported in the embodiments of the invention are discussed further. Each of these operators, when evaluated, would lead to a true or false result. For each operator, an explanation of the operator is provided followed by examples.

Equals—Value of matched attribute is equal to Target Value.
"ABC" equals "ABC" is true
"ABC" equals "DEF" is false
Does Not Equal—Value of matched attribute is not equal to Target Value.
"ABC" does not equal "DEF" is true
"ABC" does not equal "ABC" is false
Contains—Value of matched attribute contains the text of Target Value.
"AB" contains "A" is true
"AB" contains "B" is true
"AB" contains "AB" is true
"AB" contains "C" is false
Does Not Contain—Value of matched attribute does not contain the text of Target Value.
"AB" does not contain "C" is true
"AB" does not contain "A" is false
Starts With—Value of matched attribute starts with the text of Target Value.
"AB" starts with "A" is true
"AB" starts with "AB" is true
"AB" starts with "ABC" is false
"AB" starts with "C" is false
Does Not Start With—Value of matched attribute does not start with text of Target Value.
"AB" does not start with "B" is true
"AB" does not start with "ABC" is true
"AB" does not start with "A" is false
"AB" does not start with "AB" is false
Ends With—Value of matched attribute ends with text of Target Value.
"BC" ends with "C" is true
"BC" ends with "BC" is true
"BC" ends with "ABC" is false
"BC" ends with "D" is false
Does Not End With—Value of matched attribute does not end with text of Target Value.
"BC" does not end with "B" is true
"BC" does not end with "ABC" is true
"BC" does not end with "C" is false
"BC" does not end with "BC" is false Target Value Target Value is a value specified by the system administrator. It is saved as a text-based value.

When comparing the value of an attribute to the Target Value, both values generally have to be of the same data type. For example, text is compared with text, dates are compared to dates and numbers are compared with numbers. In some cases, a target value is not required, such as in the case of the "exists" and "does not exist" comparison operators.

Security Access Policy

Security access policy comprises a permission set to apply if the rule is evaluated successfully. Documents stored in document management systems have security permissions applied to them, generally in the form of Access Control Lists. These lists contain names of people who have access to the document, and the level of access that they have. The ACL also includes user groups such as "Marketing Department", each user in which receives the same level of access to that document.

When a metadata rule is evaluated, a security access policy can get applied to the document based on the results of the evaluation. The security access policy can lead to a set of operations that include for example:

Make the document hidden;
Move the document to another location;
Present a different view of the document;
Add to list of users/user groups who can see the document;
Add to list of users/user groups who can edit the document;
Add to list of users/user groups who can delete the document;
Remove specific users/user groups from list of users who can see the document;
Remove specific users/user groups from list of users who can edit the document;
Remove specific users/user groups from list of users who can delete the document;
Publish the document to the public;

The types of security access policies that can be applied depend on the capabilities of the document management system. Some systems may only support basic operations and others may contain elaborate control structures.

The metadata rules include security access polices for the document management system. Thus, access to the facilities for configuring metadata rules should be limited to system administrators. FIG. 1(b) shows a diagram 10 illustrating a sample implementation of a metadata rule configuration interface of the embodiment of the invention. The metadata rule configuration window 14 is placed within another host window 12 that is provided by the document management system for example. The metadata rule configuration window 14 provides various buttons for specifying the metadata rules.

The system of the embodiment of the invention is described next. The system 30 of the embodiment of the invention shown in FIG. 2 includes a general purpose or specialized computer having a CPU and a computer readable medium, e.g., memory, DVD, CD-ROM, floppy disk, flash memory, magnetic tape or other storage medium, having computer readable instructions stored thereon for execution by the CPU, which form various modules of the system as will be described in detail below. Alternatively, the system can be implemented in firmware, or combination of firmware and a specialized computer having a computer readable storage medium.

The structure of a system 10 for providing automated security access policy to a document in a document management system according to the embodiment of the invention is displayed in FIG. 2. A Microsoft SharePoint system is used as an example document management system. System 30 shows a SharePoint Document Library 1 connected with two modules of the embodiment of the invention: a Security Policy Configuration Module 2 and a Security Policy Determination Module 3. The document library is the container of the files. It resembles a network share on a computer, including files and folders, where certain people who are granted permission to access it. The SharePoint Document Library 1 communicates with the Security Policy Configuration Module 2 by using Connect 4.1 and with the Security Policy Determination Module 3 by using connect 4.2. The Security Policy Configuration Module 2 interacts with the Security Policy Determination Module by using Connect 4.3. The SharePoint Document Library 1 is described first followed by the Security Policy Configuration Module 2 and the Security Policy Determination Module 3.

SharePoint Document Library 1

The SharePoint Document Library 1 is a specialized type of SharePoint List for the storage of documents and allows for events to be processed when documents are added, updated, and removed from the document library. The processing of these events allows the security access policies to be applied to documents in the SharePoint Library 1.

The SharePoint Document Library 1 comprises a SharePoint Information Management Policy Configuration Module 1.0 a Document Store Module 1.4, a Permissions Module 1.5, and an Event Receivers Module 1.6. The SharePoint Information Management Policy Configuration Module 1.0 in turn includes a Document Type Definition Module 1.1, a Policies Module 1.2 and a Policy Configuration Store Module 1.3. Each of these modules is briefly described.

Document Content Type Definition Module 1.1

This module is the base document Content Type of the SharePoint Document Library (1). Content type is a definition of the metadata properties for a certain type of document. A file in a document library has a content-type, and that content-type defines the fields of metadata associated with it. Details can be found at http://msdn.microsoft.com/en-us/library/ms472236.aspx. Content types also store behavior settings associated with that type of file. It becomes the container for documents as they are stored in the Document Store (1.4).

Policies Module 1.2

This module contains a set of information management policies that can be applied to documents in this library. Information management policies enforce rules on how content is accessed and managed, generally in the context of compliance, for example Sarbanes-Oxley, etc. Information management policies are executed on items. Security access policies rely on a rights based Access Control List which determines whether or not a requested security action, for example, read file, is permitted by the logged-in user. The Policy Handler Module 2.2 is connected, through the Connect 4.1., to the Policies Module 1.2.

Policy Configuration Store Module 1.3

This module is a section of the SharePoint database used for the storage of permission settings corresponding to the policies configured by a system administrator. When a security access policy is configured by using the Policy Configuration Control Module 2.1, the data is sent through Connect 4.1 and saved in an XML format in the Policy Configuration Store Module 1.3.

Document Store Module 1.4

This module is a section of the SharePoint database where the actual documents and metadata associated with the document are stored and then associated with the SharePoint Document Library 1. The Document Store Module 1.4 exposes metadata read by the Metadata Rule Evaluator 3.2. Additions or modifications to the Document Store Module 1.4 require the Event Receivers Module 1.6 to notify their listeners.

Permissions Module 1.5

This module defines the permission set for each document in the document library. There are base permissions inherited by the SharePoint Document Library (1), as well as refined permissions on each document available in the Document Store Module 1.4. The Permission Processor Module 3.4 sets the permissions when metadata rules are evaluated.

Event Receivers Module 1.6

This module contains event receivers that allow the SharePoint Document Library 1 to communicate with the Dispatcher Module 3.1 through Connect 4.2. The events relevant to the current invention include two events in the SharePoint Document Library 1: the ItemAdded event, which occurs when a document is added, and the ItemUpdated event, which occurs when a document or the metadata associated with the document changes.

Metadata Storage Module 1.7

This module stores the metadata associated with documents. The Metadata Storage Module 1.7 comprises computer readable data stored in a computer readable storage medium e.g., memory, DVD, CD-ROM, floppy disk, flash memory and magnetic tape. Although the Metadata Storage Module 1.7 is shown as a part of the Document Store Module 1.4, it can be located outside the SharePoint Document Library 1 as well.

The Security Policy Configuration Module 2 that allows the configuration of the security access policies by the system administrator comprises a Policy Configuration Control Module 2.1, a Policy Handler Module 2.2, a Permissions Configuration Webpage 2.3 and a Permissions Settings Configuration file 2.4. Each of these is briefly described.

Policy Configuration Control Module 2.1

This module is a user interface, which allows the configuration of the information management policy available in the Policies Module 1.2. The Policy Configuration Control Module 2.1 has settings allowing the user to create metadata rules, and specify the associated permission sets, which are loaded from the Permission Settings Configuration File 2.4. These permission sets are to be applied based on the results of the evaluation of the metadata rules. This Policy Configuration Control Module 2.1 includes a hyperlink to the Permission Configuration Web page 2.3 that allows the permission sets to be defined.

Policy Handler Module 2.2

This module is a required interface to install an information management policy in the Policies Module 1.2. It handles events for Register and UnRegister sent to the Document Type Definition Module 1.1 in the SharePoint Document Library 1. It also registers the Policy Configuration Control Module 2.1 and allows it to be used.

Permission Configuration Web Page 2.3

This web page allows permission sets to be configured or defined by the system administrator. The permission set is associated with a group of SharePoint users and groups and their associated permission level. The metadata rules that include the permission sets are saved in the Permission Settings Configuration File 2.4.

Permission Settings Configuration File 2.4

This file is an XML based configuration file which stores the metadata rules including the permission sets defined using the Permission Configuration Web Page 2.3.

The Security Policy Determination Module 3 comprises a Dispatcher Module 3.1, a Metadata Rule Evaluator Module 3.2, a Dynamic Metadata Extractor Module 3.3 and a Permission Processor Module 3.4. Each of these modules is briefly described.

Dispatcher Module 3.1

This module implements the interface to Event Receivers Module 1.6 for receiving the ItemAdded and ItemUpdated events. The Dispatcher Module 3.1 then determines if processing should be performed, and if so, passes control to the Metadata Rule Evaluator Module 3.2.

Metadata Rule Evaluator Module 3.2

This module is triggered by the Dispatcher Module 3.1 to process the ItemAdded and ItemUpdated events. Once invoked, the Metadata Rule Evaluator Module 3.2 loads the saved metadata settings from the Policy Configuration Store Module 1.3, retrieves the item metadata from the Document Store Module 1.4, and extracts dynamic metadata by using the Dynamic Metadata Extractor Module 3.3. Then it evaluates the metadata rule and triggers the Permission Processor Module 3.4 to modify the permissions associated with the document.

Dynamic Metadata Extractor Module 3.3

This module that is included in alternate embodiment receives the request from the Metadata Rule Evaluator Module 3.2, and determines the metadata requirements for this metadata rule. The Dynamic Metadata Extractor Module 3.3 performs the requested dynamic analysis of the document and returns the results in the form of text metadata to the Metadata Rule Evaluator Module 3.2.

Permission Processor Module 3.4

This module loads the Permission Settings Configuration File 2.4 using Connect 4.3, receives the name of the document to process from the Metadata Rule Evaluator Module 3.2, and applies the changes to the permissions associated with the document by using the Permissions Module 1.5 in the SharePoint Document Library 1. In another embodiment of the invention the Permission Processor Module 3.4 comprises computational means 3.5 for changing the ACL in the document management system.

As noted earlier, the Dynamic Metadata Extractor Module 3.3 is included in an alternate embodiment. In yet another alternate embodiment the Dynamic Metadata Extractor Module 3.3 is external to the Security Policy Determination Module 3 and is invoked via a network connection.

The modules of the system that include modules 2, 2.1, 2.2, 2.3, 2.4, 3, 3.1, 3.2, 3.3 and 3.4 include a firmware or, alternatively, computer readable instructions stored in a computer readable storage medium for execution by a processor. The computational means 3.5 comprises computer readable code performing methods, procedures, functions or subroutines which are stored in a computer readable storage medium to be executed by a CPU.

Additional embodiments of the invention include only a subset of the all the modules described earlier. The minimum functionality to be provided includes: (i) Metadata Rule Configuration (ii) Metadata Security Access Policy Data Store (iii) Attachment to the Document Management System and (iv) Metadata Rule Processing. The minimal set of modules that can achieve this functionality are presented next.

(i) Permission Configuration Webpage 2.3: assists the system administrator with metadata rule configuration and helps in defining the metadata rules and the security access policies which should be applied. This can take the form of a computer program or a web server component.

(ii) Permission Setting Configuration File 2.4: stores the metadata rules after they are configured. Depending on the environment, the metadata rules may also be saved internally as a setting in the product configuration instead of in the Permissions Setting Configuration file 2.4.

(iii) Connect 4.1 and 4.2: serve as attachments to the document management system. In order to be able to apply security access policies to the documents, a hook into the document management system is required for receiving events. Document management systems such as SharePoint allow external programs to receive "events" from the document library, such as when a new document is added or is modified by a user. Connect 4.1 and 4.2 are used to pass on the type of the event and additional data associated with the event to the embodiments of the invention for further processing.

(iv) Metadata Rule Evaluator Module 3.2: process the metadata rules. When the event corresponding to the adding of a document in the document management system for example, is received by the embodiment of the invention, each metadata rule is evaluated. When a metadata rule is evaluated the security access policy associated with the rule is applied to the document based on the results of the evaluation.

Figure 3:
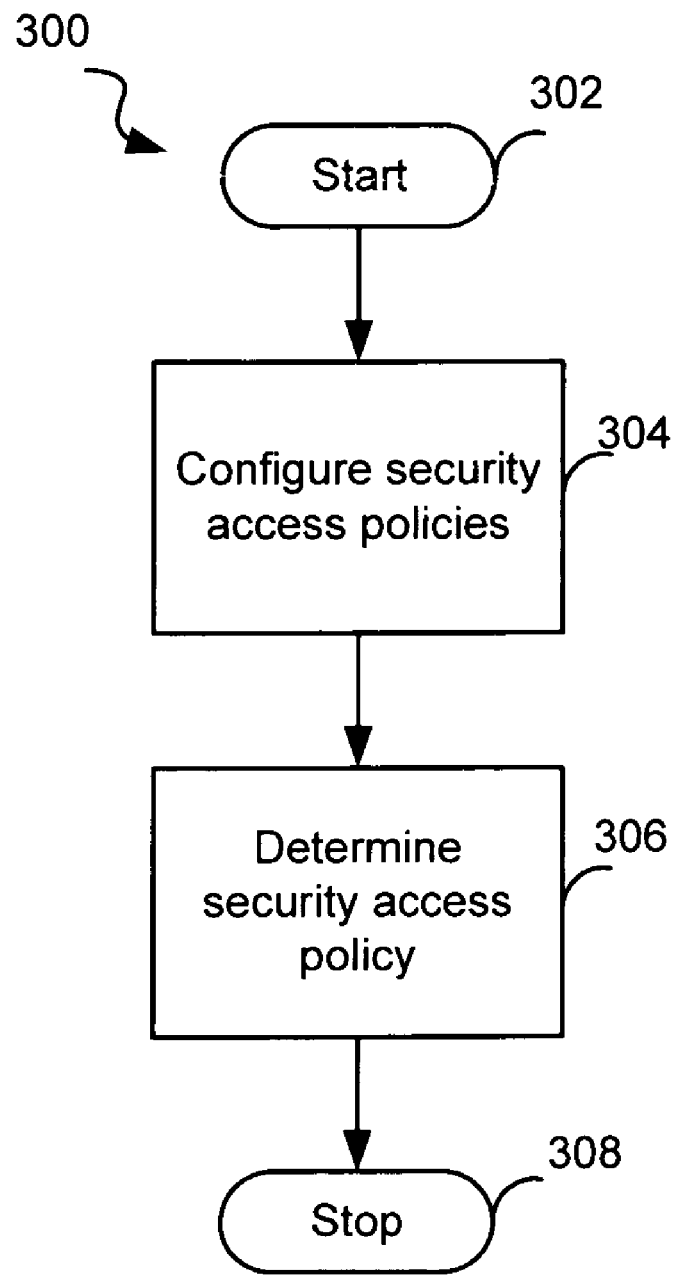
FIG. 3 shows a flowchart 300 illustrating a method for providing an automated security access policy to the document.

FIG. 3 shows a flowchart 300 illustrating a method for automatically providing a security access policy to a document management system according to the embodiments of the invention. Upon start (box 302), the procedure 300 configures the security access policies based on the input provided by the system administrator (box 304). In the next step the procedure 300 determines the security access policy to be applied to the document that is added to the document management system by the user (box 306) and exits (box 308).

Figure 4:
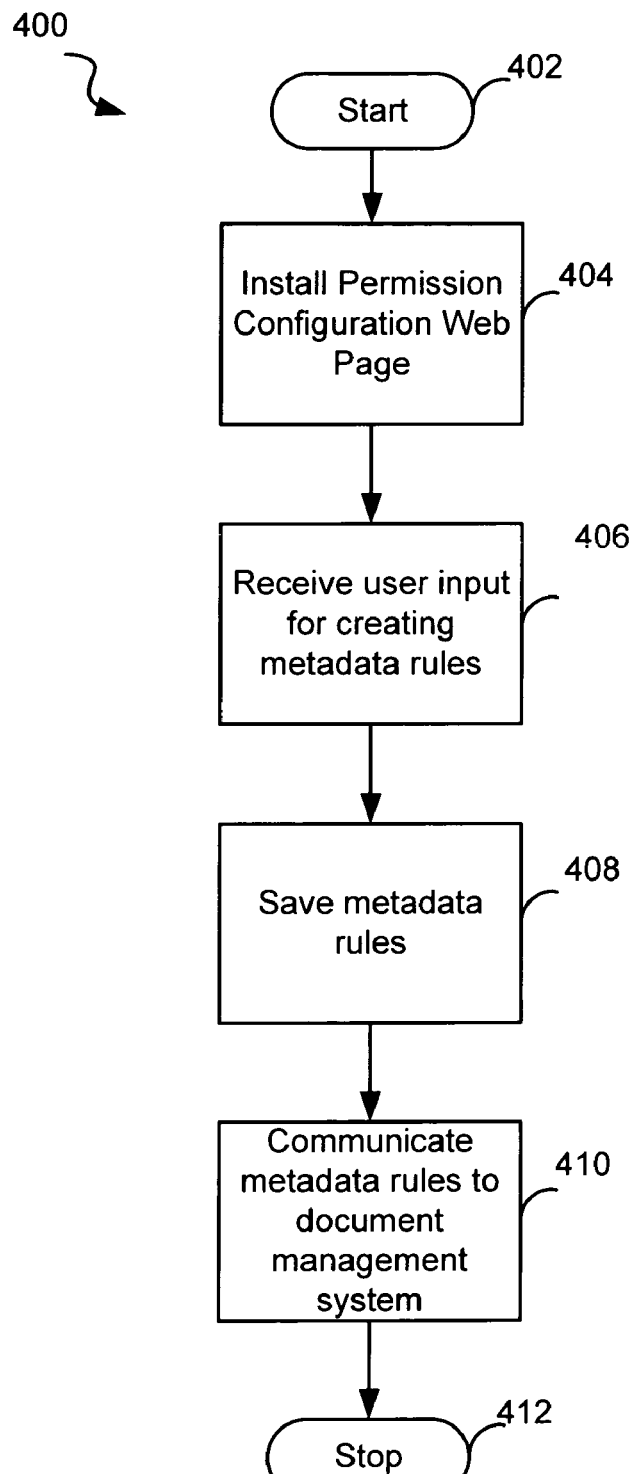
FIG. 4 illustrates the step 304 "Configure security access policies" of FIG. 3 in more detail.

FIG. 4 presents flowchart 400 illustrating the step 304 "Configure security access policies" of FIG. 3 in more detail. Upon start (box 402), the procedure 400 installs the Permission Configuration Web Page 2.3 (box 404) for facilitating the creation of metadata rules. As the system administrator configures this web page and cerates the metadata rules, the inputs from the system administrator are received by the procedure 400 (box 406). Once the system administrator completes the creation of metadata rules and invokes a "save" operation, the procedure 400 saves the metadata rules in the Permissions Setting Configuration File 2.4 (box 408), communicates the metadata rules contained in the Permissions Setting Configuration File 2.4 to the document management system (box 410), and exits (box 412).

Figure 5:
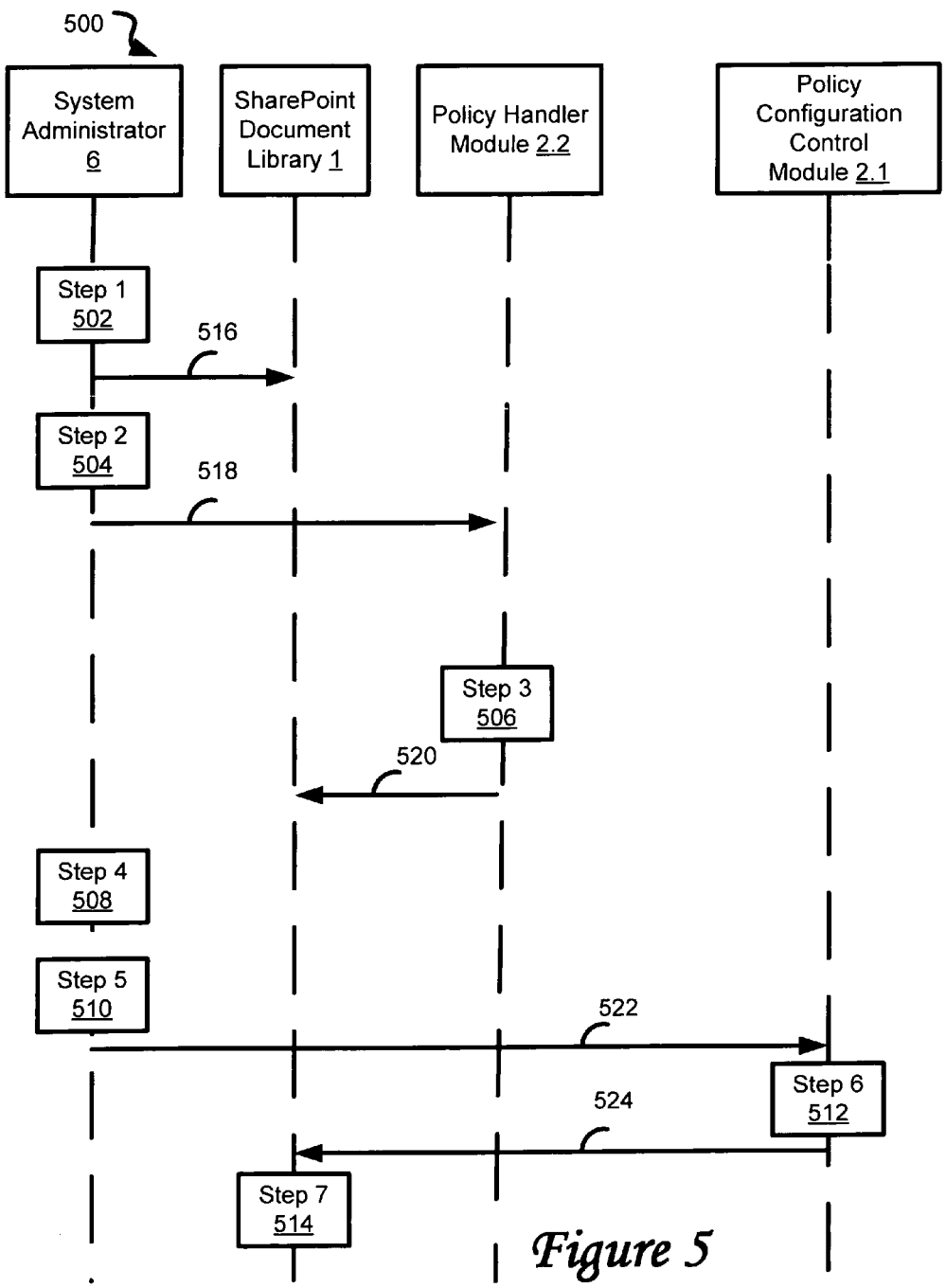
FIG. 5 illustrates the flow of operations for configuring a security access policy.

The operation of the Security Policy Configuration Module2 is explained further with the sequence diagram 500 presented in FIG. 5 that captures the sequence of operations performed when the procedure 400 is executed.

Flow of Operations—Configuring a Policy

The following operations occur when the system administrator 6 first activates and configures the metadata security policy for a document management system.

- Step 1 (502). System administrator 6 invokes 516 the configuration page of the SharePoint Document Library 1.
- Step 2 (504). System administrator 6 activates the security access policy, which causes the Register event 518 on the Policy Handler Module 2.2.
- Step 3 (506). In response to the Register event 518, Policy Handler Module 2.2 installs 520 the security access policy into the Policies Module 1.2 of the SharePoint Document Library 1. This allows the Configuration Web Page 2.3 to be installed and loaded. The Configuration Web Page 2.3 allows the system administrator 6 to create new metadata rules.
- Step 4 (508). System administrator 6 defines metadata rules and visits the Permission Configuration Web page 2.3 to define the permissions sets which are stored in the Permission Settings Configuration File 2.4.
- Step 5 (510). System administrator 6 clicks to save the changes that initiate a message 522 to the Policy Configuration Module 2.1.
- Step 6 (512). The Policy Configuration Control 2.1 creates an XML stream 524 representing the current configuration settings that is communicated to the SharePoint Document Library 1.
- Step 7 (514). This data is saved in the Policy Configuration Store 1.3 in the SharePoint Document Library 1, so that the metadata rules can be retrieved as needed.

Figure 6:
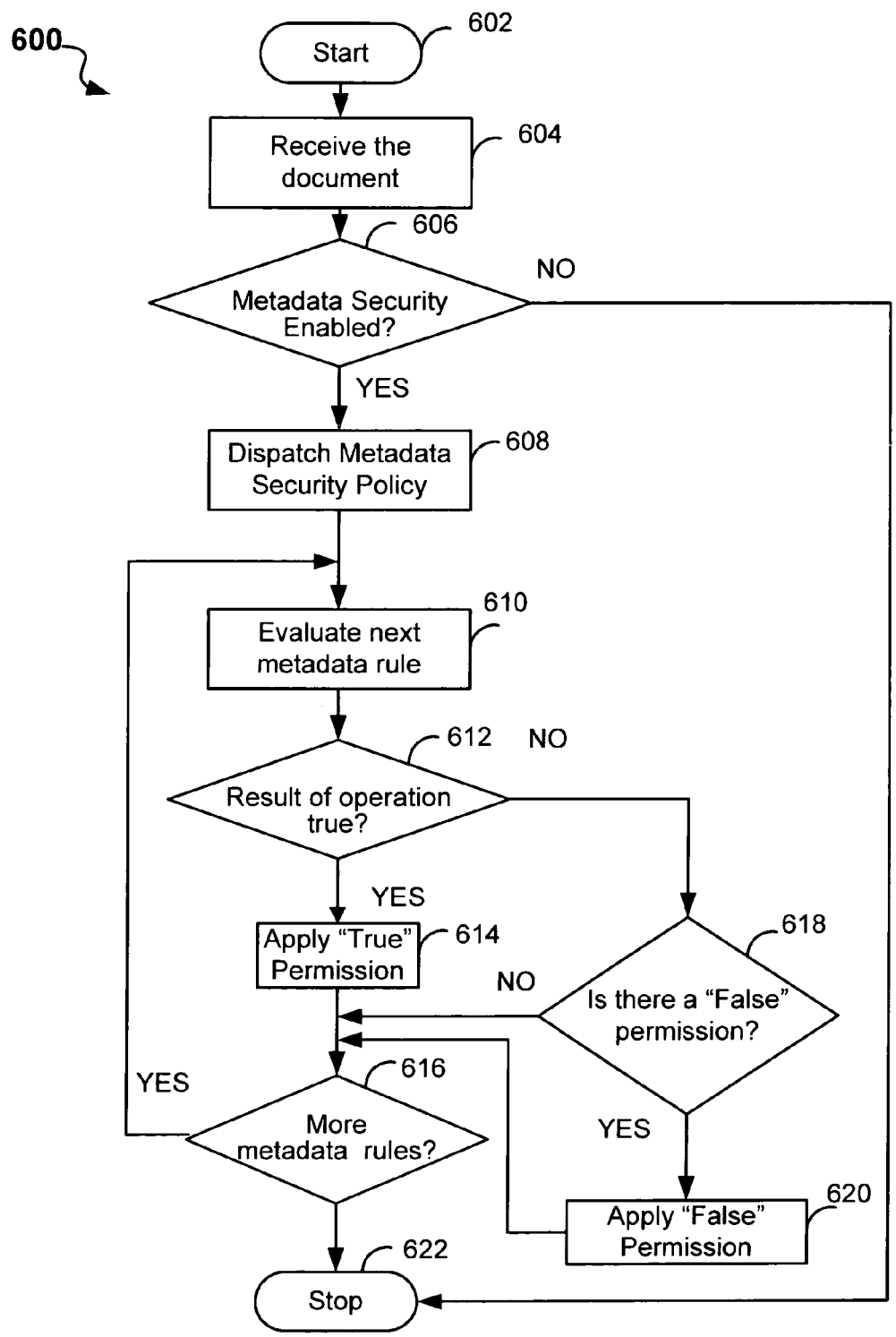
FIG. 6 illustrates the step 306 "Determine security access policy" of FIG. 3 in more detail.

FIG. 6 presents flowchart 600 illustrating the step 306 "Determine security access policy" of FIG. 3 in more detail. Upon start (box 602), the procedure 600 receives the document added by the user to the document management system (box 604) and checks whether metadata security is enabled (box 606). If not, the procedure 600 exits 'NO' from box 606 and exits (box 622). Otherwise, the procedure 600 exits 'YES' from box 606, dispatches the metadata security policy (box 608) and evaluates the first metadata rule (box 610). Whether the result of the operation specified in the metadata rule is true is evaluated. If so, the security access policy corresponding to the "If" clause of the metadata rule is followed and the "True" permission is applied (box 614). If the result of the operation is false, the procedure 600 exits 'NO' from box 612 and checks whether there is an "else" clause or a "False" permission associated with the metadata rule. If so, the procedure exits 'YES' from box 618, applies the "False" permission (box 620) and proceeds to the input of box 616. Otherwise, the procedure 600 exits 'NO' from box 618, skips box 620 and proceeds to check whether there are more metadata rules (box 616). If so, the procedure 600 proceeds to the input of box 610 to evaluate the next metadata rule. Otherwise, the procedure 600 exits (box 622). In an alternate embodiment the procedure 600 uses the Dynamic Metadata Extractor Module 3.3 for performing a dynamic analysis of the document the results of which are used in the evaluation of the metadata rules (box 610).

Figure 7:
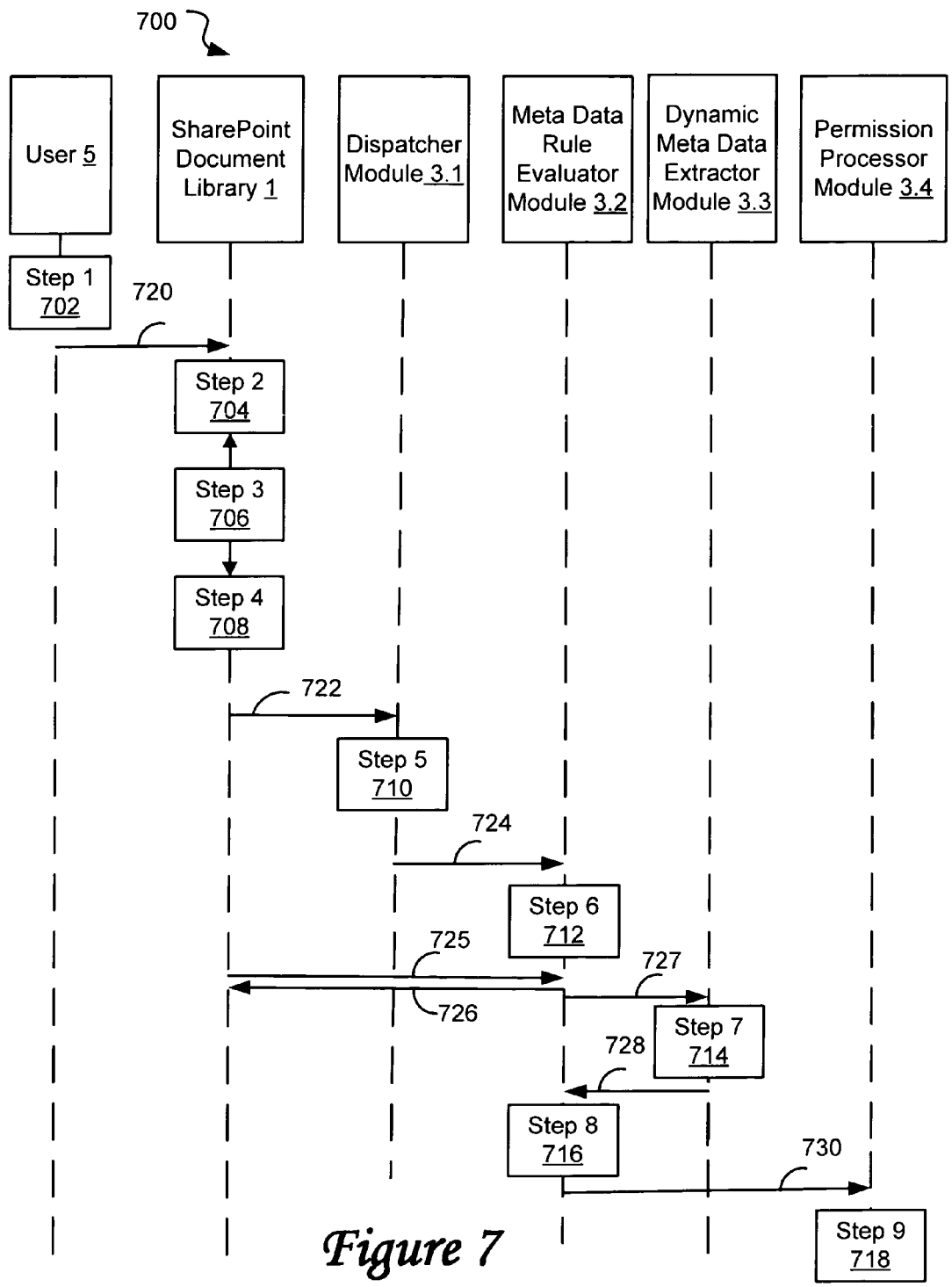
FIG. 7 illustrates the flow of operations when a document is added to a document management system.

The operation of the Security Policy Determination Module 3 is explained further with the sequence diagram 700 presented in FIG. 7 that captures the sequence of operations performed when the procedure 600 is executed.

Flow of Operations—Document Added to Document Management System

The following operations occur once the metadata security access policy is installed on the management system and a document is added by the user.

- Step 1 (702). User 5 uploads a new document of a specified Document Content Type to the SharePoint Document Library 1.
- Step 2 (704). The document is added 720 to the Document Store 1.4 in the SharePoint Document Library 1 where its metadata is saved.
- Step 3 (706). The document is initially assigned the default permissions of the SharePoint Document Library 1.
- Step 4 (708). The Event Receivers Module 1.6 dispatches the ItemAdded event 722.
- Step 5 (710). The Dispatcher Module 3.1 receives the ItemAdded event 722 and calls 724 the Metadata Rule Evaluator Module 3.2.
- Step 6 (712). The Metadata Rule Evaluator Module 3.2 receives 725 the list of metadata rules in XML from the Policy Configuration Store 1.3. It requests 726 the document metadata from the Document Store Module 1.4. In an alternate embodiment it then requests 727 dynamic metadata from the Dynamic Metadata Extractor Module 3.3.
- Step 7 (714). The Dynamic Metadata Extractor Module 3.3 receives the request 727 from the Metadata Rule Evaluator Module 3.2 and determines the metadata requirements for this metadata rule. The Dynamic Metadata Extractor Module 3.3 performs the requested dynamic analysis of the document and returns the results 728 in the form of text metadata to the Metadata Rule Evaluator Module 3.2.
- Step 8 (716). The Metadata Rule Evaluator Module 3.2 evaluates the metadata rules using the metadata associated with the document and calls 730 the Permission Processor Module 3.4 to apply the permissions of the document.
- Step 9 (718). The Permission Processor Module 3.4 loads the permission set from the Permission Settings Configuration File 2.4, and changes the document permissions to reflect the permissions in this permission set.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, multiple document management systems can be handled by a single set of Security Policy Configuration Module 2 and Security Policy Determination Module 3. The embodiments of the invention can also be used in conjunction with a computer network to remotely apply security access policies to documents in a document management system that is located in another location.

Although the embodiments of the invention have been described in detail, it will be apparent to one skilled in the art that variations and modifications to the embodiments may be made within the scope of the following claims.

What is claimed is:

1. A computerized method for automatically creating a security access policy to an electronic document in a document management system, the method comprising:

employing at least one hardware processor for performing one or more of the following:

(a1) associating metadata with the document, the metadata comprising one or more attributes of the document;

(b1) configuring security access policies to be applied to documents in the document management system, comprising specifying one or more metadata rules governing application of security access policies to the documents, comprising specifying a dynamic metadata, which is dynamically retrieved based on external content analysis of the document performed outside the document management system, comprising the metadata not inferred from contents of the document; and (c1) determining the security access policy to be applied to the document to be added to the document management system based on said one or more metadata rules and the metadata associated with the document.

2. The method of claim 1, wherein the step (b1) comprises:

(a2) creating said one or more metadata rules, comprising configuring a permission configuration web page;

(b2) storing said one or more metadata rules in a permissions setting configuration file; and (c2) communicating the permissions setting configuration file to the document management system.

3. The method of claim 2, wherein the step (b2) comprises storing the permissions setting configuration file in an Extensible Markup Language (XML) format.

4. The method of claim 1, wherein the step (a1) comprises providing the attribute comprising a first field containing a name of the attribute and a second field containing a value of the attribute.

5. The method of claim 4, wherein the step (b1) comprises specifying said one or more metadata rules comprising a target name, a target value, a comparison operation for comparing the target value with the second field of the attribute the first field of which matches the target name, and the security access policy, comprising a permission set to be applied to the document for controlling access to the document based on results of the comparison operation.

6. The method of claim 5, wherein the step (c1) comprises:

(a6) receiving a notification from the document management system regarding adding the document to the document management system;

(b6) evaluating each metadata rule by performing the comparison operation in said each metadata rule; and (c6) for said each metadata rule, applying the permission set to the document.

7. The method of claim 6, wherein the step (c6) comprises changing an access control list in the document management system, the access control list including names of users having access to the document along with corresponding levels of access of the users.

8. The method of claim 5, wherein the specifying said one or more metadata rules comprises specifying a compound expression for performing multiple comparisons on the target name and the target value.

9. The method of claim 4, comprising providing the name of the attribute selected from the group consisting of file size, file name, file type, date modified, word count, and author.

10. The method of claim 1, wherein the specifying the dynamic metadata comprises performing automated image analysis, content analysis of the document using natural language processing, or external database queries.

11. A non-transitory computer readable storage medium, having computer readable instructions stored thereon for execution by a processor, causing the processor to automatically create a security access policy to an electronic document in a document management system, comprising:

(a10) associating metadata with a document, the metadata comprising one or more attributes of the document;

(b10) configuring security access policies to be applied to documents in a document management system, comprising specifying one or more metadata rules governing application of security access policies to the documents, comprising specifying a dynamic metadata, which is dynamically retrieved based on external content analysis of the document performed outside the document management system, comprising the metadata not inferred from contents of the document; and (c10) determining a security access policy to be applied to the document to be added to the document management system based on said one or more metadata rules and the metadata associated with the document.

12. A system for automatically creating a security access policy to an electronic document in a document management system, the system comprising:

a processor, and a computer readable storage medium having computer readable instructions stored thereon for execution by the processor, forming:

(a11) a metadata storage module, storing metadata associated with the document, the metadata comprising one or more attributes of the document;

(b11) a security policy configuration module, configuring security access policies to be applied to documents in the document management system, comprising specifying one or more metadata rules governing application of security access policies to the documents, comprising specifying a dynamic metadata, which is dynamically retrieved based on external content analysis of the document performed outside the document management system, comprising the metadata not inferred from contents of the document; and (c11) a security policy determination module, determining the security access policy to be applied to the document to be added to the document management system based on said one or more metadata rules and the metadata associated with the document.

13. The system of claim 12, wherein the security policy configuration module (b11) comprises:

(a12) a policy handler module, creating said one or more metadata rules, comprising configuring a permission configuration web page;

(b12) a permissions setting configuration file, storing said one or more metadata rules; and (c12) a policy configuration control module, communicating the permissions setting configuration file to the document management system.

14. The system of claim 12, wherein the attribute of the document comprises a first field containing a name of the attribute and a second field containing a value of the attribute.

15. The system of claim 14, wherein said one or more metadata rules comprises a target name, a target value, a comparison operation for comparing the target value with the second field of the attribute the first field of which matches the target name, and the security access policy, comprising a permission set to be applied to the document for controlling access to the document based on results of the comparison operation.

16. The system of claim 15, wherein the security policy determination module (c11) comprises:

(a16) a dispatcher module, receiving a notification from the document management system regarding adding the document to the document management system;

(b16) a metadata rule evaluator module, evaluating each metadata rule by performing the comparison operation in said each metadata rule; and (c16) a permission processor module, applying, for each said metadata rule, the permission set to the document.

17. The system of claim 16, wherein the permission processor module (c16) comprises computational means for changing an access control list in the document management system, the access control list including names of users having access to the document along with respective levels of access of the users.

18. The system of claim 15, wherein said one or more metadata rules comprises a compound expression for performing multiple comparisons on the target name and the target value.

19. The system of claim 14, wherein the name of the attribute is selected from the group consisting of file size, file name, file type, date modified, word count, and author.

20. The system of claim 12, wherein the document management system is a Microsoft Share Point document library.

* * * * *